Patented July 14, 1953

2,645,639

UNITED STATES PATENT OFFICE 2,645,639

PRODUCTION OF CRYSTALLINE PENICILLIN SALTS

George H. Brown and Wendell C. Morrison, Princeton, N. J., and Earl W. Flosdorf, Forest Grove, Pa.; said Brown and said Morrison assignors to Radio Corporation of America, a corporation of Delaware No Drawing. Application April 12, 1946, Serial No. 661,882

13 Claims. (Cl. 260—239.1)

This invention relates to the production of the drug penicillin. More specifically, it relates to the production of penicillin in the preferred crystalline form.

Nearly all of the penicillin which has been produced by conventional processes has been of the amorphous variety. This has been true despite the fact that the crystalline form is greatly preferred. The crystalline form is much more stable than the amorphous variety and its potency will consequently be much less affected by temperature changes and other factors normally influencing the shelf life.

One of the conventional methods of producing crystalline penicillin has been to add acetone to an aqueous solution of the sodium salt of penicillin. When the acetone is added in proper quantities, penicillin crystallizes out of solution. However, in this as in other conventional methods the losses in the mother liquor are large, only a relatively small percentage of the penicillin salt being obtained from the solution. Because of this waste and because of the critical demand for the drug, governmental regulations have not permitted manufacturers to supply the market demand for crystalline penicillin even for specialized purposes.

An improved method of producing crystalline penicillin from an aqueous solution which includes careful control of the evaporating conditions and necessitates a final rapid evaporating step from a very thin film of solution such as obtained by centrifugal spinning has been disclosed in a co-pending application, Serial No. 649,296, filed February 21, 1946, by G. H. Brown and R. A. Bierwirth, now U. S. Patent 2,536,676. This has resulted in greatly increased production of crystalline penicillin.

It is an object of the present invention to provide a method of producing crystalline penicillin without involving the losses encountered in previous methods involving use of organic solvents.

A further object is to provide a rapid and economical method of producing crystalline penicillin.

Another object is to provide a method of producing crystalline penicillin which may be used with any type of rapid vacuum-drying process.

Still another object is to provide an improved method of crystallizing a salt of penicillin from an organic solvent.

Penicillin is commonly marketed in the form of a salt such as the sodium or calcium salt. In this form, penicillin is only very slightly soluble in organic solvents. Because of this slight solubility it has heretofore been thought economically impossible to crystallize a salt of penicillin from organic solvent solution. Of course, it has been possible to recover salts of penicillin from an aqueous solution, but the form obtained has been amorphous and will not be crystalline unless special conditions such as those disclosed in the aforementioned application of Brown and Bierwirth are adhered to.

The essence of the present invention resides in the discovery that if the penicillin is first changed to the acid form it may be dissolved in certain organic solvents and then converted to the salt form and be recovered from the organic solvents with substantially no loss either in quantity or potency.

Impurities accompanying the crystalline penicillin, or substantially crystalline penicillin, do not impair the advantages inherent in penicillin as a result of its crystalline structure per se.

The invention may be applied to obtaining the crystalline penicillin either from the clear mother liquor from the medium in which it was grown or from the first extract of same or other culture medium or from the amorphous variety which was produced by one of the conventional methods. Preferably, the mother liquor containing the penicillin is adjusted to a pH of 2 or 3 which changes the penicillin to the acid form. The drug is then extracted with a suitable organic solvent which is so chosen that nearly all of the penicillin goes into solution in the solvent. This solution is then separated from the residual mother liquor and an alkalizing reagent added to adjust the pH to a point at which the solution is nearly neutral. This results in the acid form of the penicillin being changed to the form of a salt. This solution is then rapidly evaporated and the salt is obtained in crystalline form. If it is desired to change a quantity of the amorphous variety of the penicillin salt to the crystalline form, substantially the same process is used. The amorphous salt is preferably dissolved in a small quantity of water, the pH is adjusted to 2 or 3, and the process is continued as described above.

A more specific example will now be given illustrating how the crystalline variety of sodium penicillin can be obtained from a butanol solution. Clear mother liquor from the medium in which the penicillin is grown is first adjusted to a pH of 3. This is preferably accomplished by adding a buffer solution such as one of phosphoric acid and sodium bicarbonate in a quantity sufficient to obtain the desired pH as indicated with the aid of a Fisher alkaline-acid test ribbon and an indicator such as methyl orange or preferably with an electrical pH meter. A quantity of butanol is added which is sufficient to dissolve the penicillin now in acid form. The mixture is shaken thoroughly and the butanol layer, which now contains the penicillin, in amount as provided by the ratio of the partition coefficient, is separated from the remaining liquid. To the butanol solution solid sodium bicarbonate is then added until a pH of about 6.5 is reached. The end point is determined with the aid of Fisher test paper and Brom-Cresol purple indicator, or preferably with an electrical pH meter. The penicillin in the butanol solution is now in the form of the sodium salt and although it remains in solution it is probably in a supersaturated state. The solution is then rapidly evaporated to dryness. This may be accomplished by simultaneously applying centrifugal force and heating either with a source of radio frequency energy, radiant heat or other form of heat. The solution may simply be spread out on shelves in trays or bottles and heated on an ordinary hot plate. In any case, it is necessary that the evaporation take place with relative rapidity and at comparatively low temperatures so as not to reduce the potency of the drug. It is well known that penicillin is labile in the presence of heat. That is, it loses potency if kept above a critical temperature for an unduly prolonged period of time. For short periods of time, it may be raised to 65° or 70° C. but even this temperature sometimes results in appreciably lessened potency. Rapid evaporation is achieved by carrying out the process under vacuum conditions. A reduced pressure below 20 inches of vacuum should be used and 20 to 30 mm. of mercury absolute pressure is preferred. The temperature should not exceed 70° C. and preferably is not allowed to exceed 30° C. Under these conditions, a crystalline product is obtained which also has an improved degree of purity.

Sodium bicarbonate is just sufficiently soluble in butanol to obtain a pH of about 6.5 which hydrogen ion concentration is ideally suitable for the process. If a solvent is used in which sodium bicarbonate or other alkalizing agent utilized is not sufficiently soluble, said agent may be used anyway since it may be added in solid form and kept in suspension. The penicillin will be changed to salt form just the same and will separate out in crystalline form when the solution is evaporated rapidly to dryness.

The particular organic solvent used in the process is critical only from the standpoint of percentage recovery from the mother liquor as determined by the partition coefficient. The acid form of penicillin is soluble in a wide variety of organic compounds, such as ethers, esters, and alcohols as well as chloroform and related compounds. The degree of solubility, as well as its partition coefficient with water, however, differ and the preferred solvents are chloroform, ethyl ether, amyl acetate, amyl alcohol and butanol. If one is satisfied with lower yields, other members of the groups represented in this list may be used, as well as certain hydrocarbon solvents and other organic types.

The allowable pH range is more important. For the acid form a pH of 2 or 3 is necessary. If the pH is allowed to drop substantially below 2, the potency of the penicillin is reduced. The potency is also reduced if the pH is allowed to rise substantially above 7. Therefore, in forming the salt a pH of 6 or 7 is important.

The acid reagent for obtaining the lower pH value should be selected from the standpoint of providing an acid radical which is without toxicity if it remains in the drug after evaporation and which is not inactivating on penicillin. For this reason the phosphate is preferred, although others such as the sulfate may be used. A salt of an acid may be used just as well as the acid itself in buffer solution. For example, a sodium phosphate buffer could be used in place of phosphoric acid.

For the alkalizing reagent a compound should be selected having a metallic radical not objectionable in the crystalline salt of the drug. Alkalies of sodium and calcium may therefore be used safely. It is preferred to use either the carbonates or bicarbonates of sodium or calcium. Any of the alkali or alkaline earth metal bases may be used to obtain the crystalline salt of penicillin but it has not been desired to market the drug in any except the sodium and calcium forms.

It is not necessary to convert the penicillin to the acid form before adding the organic solvent. Results equally good or better can be obtained by adding the solvent first and then adding the phosphoric acid-sodium bicarbonate or other acid buffer to get the penicillin into its acid form. The initial presence of the solvent does not prevent the change from taking place.

There has thus been presented a greatly improved method for obtaining the preferred crystalline form of penicillin which does not require any particular type of apparatus not already used in earlier methods of manufacturing the drug. The fact that ordinary heating methods may be used to evaporate the solution to dryness is an especially important advantage from the cost angle and the fact that penicillin of improved stability is obtained is an added advantage.

We claim as our invention:

1. The process for preparing pure, crystalline penicillin from a non-aqueous medium comprising neutralizing a solution of acid penicillin in an organic solvent immiscible with water, with a salt in solid form which is selected from the class consisting of carbonates and bicarbonates of the alkali and alkaline earth metals to form a penicillin salt of one of said metals in the solution, and evaporating said solvent under reduced pressure at low temperature to form crystalline penicillin.

2. A process according to claim 1 in which said organic solvent is selected from the class consisting of chloroform, ethyl ether, amyl acetate, amyl alcohol and butanol and said metal salt is sodium bicarbonate.

3. A process according to claim 2 in which said organic solvent is butanol.

4. A process according to claim 1 in which said organic solvent is selected from the class consisting of chloroform, ethyl ether, amyl acetate, amyl alcohol and butanol and said metal salt is sodium carbonate.

5. A process according to claim 4 in which said organic solvent is butanol.

6. A process according to claim 1 in which said organic solvent is selected from the class consisting of chloroform, ethyl ether, amyl acetate, amyl alcohol and butanol and said metal salt is calcium carbonate.

7. The process for preparing pure, crystalline sodium penicillin which comprises acidifying an aqueous solution of amorphous penicillin to a pH between 2 and 3, extracting acid penicillin therefrom with butanol, neutralizing the butanol extract solution by the addition of solid sodium bicarbonate to form sodium penicillin in the solution, and removing the butanol from the solution by evaporation under reduced pressure at low temperature to form crystalline sodium penicillin.

8. The process for preparing pure, crystalline alkali metal penicillin which comprises acidifying an aqueous solution of amorphous penicillin to a pH between 2 and 3, extracting acid penicillin therefrom with butanol, neutralizing the butanol extract solution by the addition of alkali metal bicarbonate in solid form to form alkali metal penicillin in the solution, and removing the butanol from the solution by evaporation under reduced pressure at low temperature to form crystalline alkali metal penicillin.

9. The process for preparing pure, crystalline sodium penicillin which comprises acidifying an aqueous solution of amorphous penicillin to a pH between 2 and 3 with phosphoric acid, extracting acid penicillin therefrom with an organic solvent for said penicillin which is immiscible with water, neutralizing the organic solvent extract solution by the addition of sodium bicarbonate to form sodium penicillin in the solution, and dehydrating and concentrating the organic solvent extract solution by evaporation under reduced pressure at low temperature to form crystalline sodium penicillin.

10. The process for preparing pure, crystalline sodium penicillin which comprises acidifying an aqueous solution of penicillin to a pH between 2 and 3, extracting acid penicillin therefrom with an organic solvent selected from the class consisting of chloroform, ethyl ether, amyl acetate, amyl alcohol and butanol, neutralizing the organic solvent extract solution by the addition of solid sodium bicarbonate to form sodium penicillin in the solution, and removing the organic solvent from the solution by evaporation under reduced pressure at low temperature to form crystalline sodium penicillin.

11. The process for preparing pure, crystalline sodium penicillin which comprises acidifying an aqueous solution of penicillin to a pH between 2 and 3, extracting acid penicillin therefrom with an organic solvent selected from the class consisting of chloroform, ethyl ether, amyl acetate, amyl alcohol and butanol, neutralizing the organic solvent extract solution with the addition of solid sodium carbonate to form sodium penicillin in the solution, and removing the organic solvent from the solution by evaporation under reduced pressure at low temperature to form crystalline sodium penicillin.

12. The process for preparing pure, crystalline calcium penicillin which comprises acidifying an aqueous solution of penicillin to a pH between 2 and 3, extracting acid penicillin therefrom with an organic solvent selected from the class consisting of chloroform, ethyl ether, amyl acetate, amyl alcohol and butanol, neutralizing the organic solvent solution by the addition of solid calcium carbonate to form calcium penicillin in the solution, and removing the organic solvent from the solution by evaporation under reduced pressure and under low temperature to form crystalline calcium penicillin.

13. The process for preparing pure, crystalline penicillin which comprises acidifying an aqueous solution of penicillin to a pH between 2 and 3, extracting acid penicillin therefrom with an organic solvent selected from the class consisting of chloroform, ethyl ether, amyl acetate, amyl alcohol and butanol, neutralizing the organic solvent extract solution by the addition, in solid form, of a salt selected from the class consisting of alkali and alkaline earth metal carbonates and bicarbonates, and evaporating the organic solvent from the solution under reduced pressure at low temperature to form crystalline penicillin.

GEORGE H. BROWN.
WENDELL C. MORRISON.
EARL W. FLOSDORF.

References Cited in the file of this patent

UNITED STATES PATENTS

| Number | Name | Date |
| --- | --- | --- |
| 2,459,315 | Goldberg et al. | Jan. 18, 1949 |
| 2,461,949 | Wintersteiner et al. | Feb. 15, 1949 |
| 2,480,991 | Wintersteiner et al. | Sept. 6, 1949 |
| 2,485,277 | Wintersteiner et al. | Oct. 18, 1949 |
| 2,496,848 | Bernhart | Feb. 7, 1950 |
| 2,520,098 | Hodge | Aug. 22, 1950 |
| 2,538,735 | Senkus | Jan. 16, 1951 |
| 2,580,364 | Senkus | Dec. 25, 1951 |
| 2,602,045 | Hodge | July 1, 1952 |

OTHER REFERENCES

Florey et al., "The Lancet," August 16, 1941, p. 180.

Science, vol. 96, pp. 20, 21, July 3, 1942.

Nature, October 7, 1944, p. 459.

Proc. Soc. Exp. Bio. Med., April 1944, pp. 246–248.

Abraham, British Journal of Experimental Pathology, vol. 23, June 1942, pp. 103–1115.